US010236513B2

(12) United States Patent
Goodenough et al.

(10) Patent No.: US 10,236,513 B2
(45) Date of Patent: Mar. 19, 2019

(54) ALKALI-METAL BATTERIES WITH A DENDRITE-FREE ANODE INTERFACING AN ORGANIC LIQUID ELECTROLYTE

(71) Applicant: Board of Regents, The University of Texas System, Austin, TX (US)

(72) Inventors: John B. Goodenough, Austin, TX (US); Leigang Xue, Austin, TX (US); Byoungchul You, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 4 days.

(21) Appl. No.: 15/452,337

(22) Filed: Mar. 7, 2017

(65) Prior Publication Data

US 2017/0301922 A1 Oct. 19, 2017

Related U.S. Application Data

(60) Provisional application No. 62/310,157, filed on Mar. 18, 2016.

(51) Int. Cl.
| | |
|---|---|
| *H01M 4/38* | (2006.01) |
| *H01M 4/40* | (2006.01) |
| *H01M 4/58* | (2010.01) |
| *H01M 4/76* | (2006.01) |
| *H01M 10/0568* | (2010.01) |
| *H01M 10/054* | (2010.01) |
| *C22C 24/00* | (2006.01) |
| *H01M 4/134* | (2010.01) |
| *H01M 10/0569* | (2010.01) |
| *H01M 4/66* | (2006.01) |
| *H01M 10/052* | (2010.01) |
| *H01M 2/16* | (2006.01) |

(52) U.S. Cl.
CPC ............. *H01M 4/76* (2013.01); *C22C 24/00* (2013.01); *H01M 4/134* (2013.01); *H01M 4/381* (2013.01); *H01M 4/40* (2013.01); *H01M 4/58* (2013.01); *H01M 4/663* (2013.01); *H01M 10/052* (2013.01); *H01M 10/054* (2013.01); *H01M 10/0568* (2013.01); *H01M 10/0569* (2013.01); *H01M 2/1626* (2013.01); *H01M 2220/20* (2013.01); *H01M 2300/0037* (2013.01)

(58) Field of Classification Search
CPC ..... C22C 24/00; H01M 10/052; H01M 4/381; H01M 10/0569; H01M 4/40
See application file for complete search history.

(56) References Cited

U.S. PATENT DOCUMENTS

| | | | |
|---|---|---|---|
| 4,431,719 A | * | 2/1984 | Urry ...................... H01M 4/64 429/105 |
| 2003/0198862 A1 | | 10/2003 | Struthers |
| 2009/0208783 A1 | | 8/2009 | Leng et al. |
| 2013/0157149 A1 | | 6/2013 | Peled et al. |
| 2015/0024247 A1 | | 1/2015 | Lockett et al. |
| 2015/0044545 A1 | | 2/2015 | Liu et al. |

OTHER PUBLICATIONS

International Search Report and Written Opinion for PCT Patent Application No. PCT/US2017/021121, dated Jun. 21, 2017; 13 pages.
Xue, Leigang, et al. "Liquid K—Na Alloy Anode Enables Dendrite-Free Potassium Batteries." Advanced Materials 28.43 (2016): 9608-9612.
Zhou, Weidong, et al. "Plating a dendrite-free lithium anode with a polymer/ceramic/polymer sandwich electrolyte." Journal of the American Chemical Society 138.30 (2016): 9385-9388.
Li, Yutao, et al. "Mastering the interface for advanced all-solid-state lithium rechargeable batteries." Proceedings of the National Academy of Sciences (2016): 201615912.
Braga M. Helena et al. "Glass-amorphous alkali-ion solid electrolytes and their performance in symmetrical cells." Energy & Environmental Science 9.3 (2016): 948-954.
Xue, Leigang, et al. "Liquid-Alloy Anode with a Liquid Oraganic Eletrolyte." Texas Materials Institute, The University of Texas at Austin; 12 pages, 2016.
Xue, Leigang, et al. "Liquid-Alloy Anode Enables Safe Alkali-Metal Batteries." Texas Materials Institute, The University of Texas at Austin; 14 pages, 2016.

* cited by examiner

*Primary Examiner* — Ladan Mohaddes
(74) *Attorney, Agent, or Firm* — Baker Botts L.L.P.

(57) ABSTRACT

A rechargeable battery cell has an organic-liquid electrolyte contacting a dendrite free alkali-metal anode. The alkali-metal anode may be a liquid at the operating temperature that is immobilized by absorption into a porous membrane. The alkali-metal anode may be a solid that wets a porous-membrane separator, where the contact between the solid alkali-metal anode and the liquid electrolyte is at micropores or nanopores in the porous-membrane separator. The use of a dendrite-free solid lithium cell was demonstrated in a symmetric cell with a porous cellulose-based separator membrane. A K+-ion rechargeable cell was demonstrated with a liquid K—Na alloy anode immobilized in a porous carbon membrane using an organic-liquid electrolyte with a Celgard® or glass-fiber separator.

19 Claims, 7 Drawing Sheets

ALKALI-METAL BATTERIES WITH A DENDRITE-FREE ANODE INTERFACING AN ORGANIC LIQUID ELECTROLYTE

PRIORITY CLAIM

The present application claims priority under 35 U.S.C. § 119(e) to U.S. Provisional Patent Application Ser. No. 62/310,157, filed Mar. 18, 2016, titled "ALKALI-METAL BATTERIES WITH A DENDRITE-FREE ANODE INTERFACING AN ORGANIC LIQUID ELECTROLYTE," which is incorporated by reference herein in its entirety.

GOVERNMENT LICENSE STATEMENT

This invention was made with government support under Grant no. DE-SC0005397 and Grant no. DE-AR0000297 awarded by the Department of Energy. The government has certain rights in the invention.

TECHNICAL FIELD

This disclosure relates generally to electrochemical energy storage and, more particularly, to alkali-metal batteries with a dendrite-free anode interfacing an organic-liquid electrolyte.

BACKGROUND

Rechargeable (secondary) lithium-ion batteries are widely utilized in consumer electronic devices such as cell phones and laptop computers owing, in part, to their high energy density. Rechargeable lithium-ion batteries are also useful in power-intensive applications, such as in electric vehicles and power tools. Additional uses for rechargeable lithium-ion batteries, such as in energy grid storage, are possible.

Although rechargeable batteries with other alkali-metal ions, such as sodium and potassium, are less widespread, they may be used in many of the same applications as lithium-ion batteries.

A rechargeable battery stores electrical energy as chemical energy in two electrodes, an anode and a cathode, that are separated from one another inside the battery by an electrolyte and, if the electrolyte is a liquid, by a separator. The separator may be chemically inert on contact with the electrodes, and the separator is permeable to the liquid electrolyte. A chemical reaction that occurs between the two electrodes has two components, an ionic component and an electronic component. The electrolyte is an ionic conductor, but an electronic insulator. Therefore the ionic component of the chemical reaction flows inside the battery as an ionic current in the electrolyte, while the electronic component flows outside the battery in an external circuit as an electronic current. The electronic current may be stopped by opening the electronic circuit and the ionic current may be stopped at open-circuit by an internal electrical field created by a positive charge on the cathode and a negative charge on the anode.

When the battery is discharged, positively charged ions flow inside the battery and the negatively charged electrons flow outside the battery from the anode to the cathode where they recombine to complete the chemical reaction between the electrodes. On discharge, the battery delivers to the external electronic circuit an electric current I at a voltage V for a time $\Delta t$ until the chemical reaction between the electrodes is completed; thus, the battery transforms the stored chemical energy of the electrode into electric power $P=IV$. When a rechargeable battery cell is charged, an outside power source supplies a charging current at a charging voltage that reverses the ionic and electronic current flows and, therefore, reverses the chemical reaction to store the applied electric power as chemical energy.

On charge, plating of an alkali metal as the anode from a liquid electrolyte is not smooth; dendrites form and grow from the alkali-metal surface. The dendrites may grow across the electrolyte to the cathode and may create an internal electronic short-circuit that can heat the battery cell and, with a flammable electrolyte, may create a fire. Therefore, in today's lithium-ion battery cells, the anode is commonly carbon, which stores the $Li^+$ ions at a voltage close to that created by metallic lithium. However, if the rate of charge is too high, the charging voltage may become high enough to plate metallic lithium on the carbon and may result in the formation of dendrites.

An additional anode problem may arise because, even if the anode stores $Li^+$ ions at a lower voltage than carbon, the anode may react chemically with the electrolyte unless a solid-electrolyte interphase (SEI) layer forms to stop the anode-electrolyte reaction. The passivating SEI layer on the anode is permeable to the $Li^-$ ions, and the $Li^+$ of the SEI are taken from the cathode on the initial charge, which reduces the amount of stored electrical energy.

In order to safely increase the rate of charge, other known means of storing $Li^+$ ions in the anode may include using other insertion hosts than carbon, alloys, and conversion reactions. However, such means of storing $Li^+$ in the anode may still remain unsatisfactory in terms of the density of energy stored.

Thus, present-day rechargeable batteries are unable to incorporate safely an alkali-metal anode because of potential dendrite formation, among other undesirable effects.

SUMMARY

As will be described in further detail, various examples of alkali-metal batteries with a dendrite-free anode that interfaces an organic-liquid electrolyte are disclosed. The alkali-metal batteries disclosed herein may suppress formation of dendrites to allow a safe rechargeable battery with either an alkali-metal or a liquid-metal alloy as the anode that interfaces an organic-liquid electrolyte.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective element. Thus, for example, device '12-1' refers to an instance of a device class, which may be referred to collectively as devices '12' and any one of which may be referred to generically as a device '12'.

Advancing the rechargeable battery beyond the Li-ion battery used to power hand-held devices to one that can power an electric road vehicle safely, and at an acceptable cost and rate of charge, is a highly desirable technical goal. Such improvements may alleviate undesirable environmental and health effects of gaseous products of the internal-combustion engine and may help move modern society toward a more sustainable energy economy. One key technology for enabling improved batteries may involve developing a safe, low-cost battery with an alkali-metal anode.

As described above, electrochemical plating of an alkali-metal anode from an organic liquid electrolyte is plagued by dendrite formation and growth, which is a major cause of battery failure. The dendrites may form during charging and can grow across the electrolyte to the cathode to give an internal short-circuit with incendiary, or even explosive, consequences. In addition, the scarcity of lithium (Li) on Earth may limit the market potential for large-capacity batteries with lithium-anode cells in the transportation and energy sectors. Therefore, a lithium or another alkali-metal anode that remains dendrite-free on plating the anode during charge with an organic-liquid electrolyte is desirable.

The alkali metals sodium (Na) and potassium (K) are interesting alternatives and are more than a thousand times more abundant than lithium and are widely available in the oceans. Although the identification of a large-capacity host cathode for fast, reversible insertion of the larger guest $Na^-$ and $K^+$ ions is more difficult than for $Li^+$, the $MnFe(CN)_6$ double-perovskite framework is known to give an acceptable reversible capacity for reversible $Na^+$ insertion.

The inventors of the present disclosure have been motivated by this observation and have experimented with the use of a liquid K—Na alloy as the anode of a rechargeable battery with an organic-liquid electrolyte. Dendrites do not form on a liquid alkali-metal anode and the K—Na phase diagram shows a eutectic temperature of −12.6° C., which is suitable to allow a liquid alloy phase of K—Na at 25° C. for a wide range of battery applications. Furthermore, a liquid alkali-metal alloy, such as K—Na, is immiscible with the organic-liquid electrolyte commonly used in Li-ion or Na-ion batteries. Immiscible liquids are desirable because of the possibility of a liquid-liquid electrode-electrolyte interface, provided the liquid electrode, which changes volume during charge/discharge cycling, can be immobilized and induced to wet the surface of the liquid electrolyte at the operating temperature, preferably at around room temperature.

For the K—Na alloy composition, a dendrite-free liquid phase comprising 9.2 to 58.2 wt. % Na is observed at 25° C., which can provide a high specific capacity of 629 mAh $g^{-1}$ for a Na-metal battery, and 579 mAh $g^{-1}$ for a K-metal battery. At room temperature, the K—Na liquid extends from 9.2 to 58.2 wt. % Na according to the phase diagram. For a charged 100 g anode having 58.2 wt. % Na, 54.0 g Na is removed to become Na(9.2 wt. %)-K(90.8 wt. %). The specific capacity of the anode for a Na-metal battery can be calculated as follows:

$$C_{Na(58.2\% \rightarrow 9.2\%)} = \frac{nF}{m} = \frac{\frac{54.0\,g}{23\,g\,mol^{-1}} \times 96485\,C\,mol^{-1}}{100\,g} = \frac{\frac{54.0\,g}{23\,g\,mol^{-1}} \times \frac{96485}{3.6}\,mAh\,mol^{-1}}{100\,g} = 629\,mAh\,g^{-1}$$

In a similar way, in a K-metal battery, for a charged 100 g anode of 90.8 wt. % K, 84.2 g K is removed to become Na(58.2 wt. %)-K(41.8 wt. %). The specific capacity of the anode for the K-metal battery can be calculated as follows:

$$C_{K(90.8\% \rightarrow 41.8\%)} = \frac{nF}{m} = \frac{\frac{84.2\,g}{39\,g\,mol^{-1}} \times 96485\,C\,mol^{-1}}{100\,g} = \frac{\frac{84.2\,g}{39\,g\,mol^{-1}} \times \frac{96485}{3.6}\,mAh\,mol^{-1}}{100\,g} = 579\,mAh\,g^{-1}$$

Therefore, the K—Na liquid anode could deliver a specific capacity of 629 mAh $g^{-1}$ for a Na-metal battery, and 579 mAh $g^{-1}$ for a K-metal battery.

As described in further detail herein, in one embodiment, a room-temperature full cell battery is disclosed with a liquid K—Na alloy as the anode, a conventional organic-liquid electrolyte containing $NaClO_4$ or $KClO_4$ as the ion-producing salt, and the cyanoperovskite host framework $MnFe(CN)_6$ as the host cathode. The liquid-alloy anode was immobilized in a carbon matrix to wet the surface of the liquid electrolyte. In order to allow for both charge and discharge within the liquid-alloy phase range, a composition of 33.7 wt. % of Na was chosen for the K—Na liquid alloy referred to herein.

The K—Na liquid alloy has a very strong surface tension and bonds more strongly with itself than with most surfaces, thereby preventing wetting of the liquid-electrolyte surface and impeding penetration into a porous carbon matrix. The porous separator may be a membrane that is a polypropylene-polyethylene-polypropylene membrane (CELGARD® membrane separator, Celgard LLC, Charlotte, N.C.), or a glass-fiber membrane. Because of the high surface tension, the bulk liquid K—Na alloy beads on the surface of the liquid electrolyte impregnated into a porous separator and may not provide good cation transport between the liquid anode and the liquid electrolyte.

In order to form the K—Na liquid alloy into an electrode that has a high surface area of interaction with the liquid electrolyte, the K—Na liquid alloy was absorbed in a porous carbon membrane. It is noted that other porous matrices may be used in different implementations. Based on the knowledge that liquid K—Na alloys are readily absorbed by silica-gel material (porous $SiO_2$), absorption of the K—Na alloy (66.3 wt. % K/33.7 wt. % Na) was attempted with carbon paper as the porous matrix, but no absorption at room temperature was observed. After increasing the temperature to 420° C., the liquid K—Na alloy was absorbed into the carbon paper, and it was observed that 1 g of carbon paper absorbed about 5 g of the K—Na liquid alloy, whereby the use of a higher porosity matrix was expected to further increase the K—Na liquid alloy loading. It is noted that higher or lower wetting temperatures may be used in different embodiments.

As a result, a silver-colored K—Na/C (referred to herein as 'KNC') sheet was obtained that can be cut into any shape to form an electrode. From the KNC sheet, disk anodes were formed for coin-cell tests (see FIG. 3). For comparison, a similar disk anode was formed containing pure solid Na in a Na sheet.

In a first example of a dendrite-free anode electrolyte interface described in further detail below, the two disk anodes, formed from the KNC sheet and the Na sheet for comparison, were each assembled into symmetric cells that were cycle tested.

In a second example of a dendrite-free anode electrolyte interface described in further detail below, two disk anodes formed from the KNC sheet and two disc electrodes formed from the Na sheet as a control, were cycle tested with a Na—MnFe(CN)$_6$ cathode and a NaClO$_4$ electrolyte.

In a third example of a dendrite-free anode electrolyte interface described in further detail below, a disk anode formed from the KNC sheet was cycle tested with a Na—MnFe(CN)$_6$ cathode and a KClO$_4$ electrolyte.

In a fourth example, a dendrite-free anode interfacing an organic-liquid electrolyte is described in further detail below. In the fourth example, a Li-metal anode was used with a porous cellulose-based separator membrane impregnated by the liquid electrolyte. The fourth example was also cycle tested in a symmetric cell.

Figure 1:
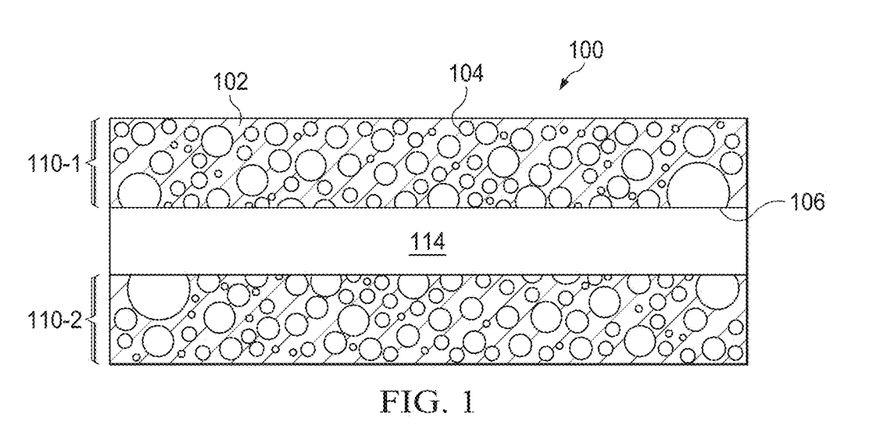
FIG. 1 is a block diagram of selected elements of an embodiment of a symmetric cell.

Turning now to the drawings, FIG. 1 illustrates selected elements of an example of a symmetric cell 100. As shown, symmetric cell 100 may be used for testing and evaluation of an anode material. Electrical connections, such as power and measurement taps, are omitted from FIG. 1 for descriptive clarity. It is noted that FIG. 1 is a schematic illustration for descriptive purposes and is not drawn to scale and does not show an actual physical material structure.

As shown, symmetric cell 100 is used in the first example and the fourth example described below. Symmetric cell 100 comprises two identical electrodes 110 separated by a porous separator 114, that contains a liquid electrolyte. Thus, by applying a voltage across electrodes 110, ion transport occurs across the liquid electrolyte in porous separator 114 and may result in stripping of the mobile cation from one electrode 110-1 and plating of the solid metal on the other identical electrode 110-2, whereby the direction of the ion transport is determined by the polarity of the applied voltage. In certain embodiments, such as the fourth example described herein, a solid alkali-metal may be used for electrodes 110 that interface a porous cellulose membrane separator used for porous separator 114.

In FIG. 1, additional details for electrode 110-1 are shown and described, while it will be understood that electrode 110-2 is substantially identical in composition and structure as electrode 110-1 for symmetric cell 100. Specifically, electrode 110-1 may comprise a matrix phase 102 and an absorbed phase 104, shown as circular structures for descriptive clarity, although in various embodiments, the actual shape and form of the matrix phase 102 and the absorbed phase 104 may vary. It is noted that FIG. 1 depicts a generalized cross-section for descriptive purposes. In various embodiments, absorbed phase 104 may be a continuous phase within electrode 110 that is conductive to ions and electrons, from one edge surface to another edge surface. In the embodiments disclosed herein, matrix phase 102 may be a carbon-based membrane, a polymer membrane, a porous ceramic membrane, a porous gel membrane, a cellulose-based membrane, a fiber-matrix membrane, or any combination thereof. In the embodiments disclosed herein, absorbed phase 104 may be an alkali metal or an alkali metal alloy.

In particular, the structure of electrode 110-2 shows how absorbed phase 104 may contact the electrolyte in porous separator 114 at surface 106, while still remaining contained within electrode 110-2.

In particular embodiments when electrodes 110 comprise a solid metal (not shown), such as an alkali metal or an alkali metal alloy, porous separator 114 may be a porous cellulose-based membrane. A solid metal used for electrode 110 may contact the electrolyte via nanopores or micropores in porous separator 114.

Figure 2:
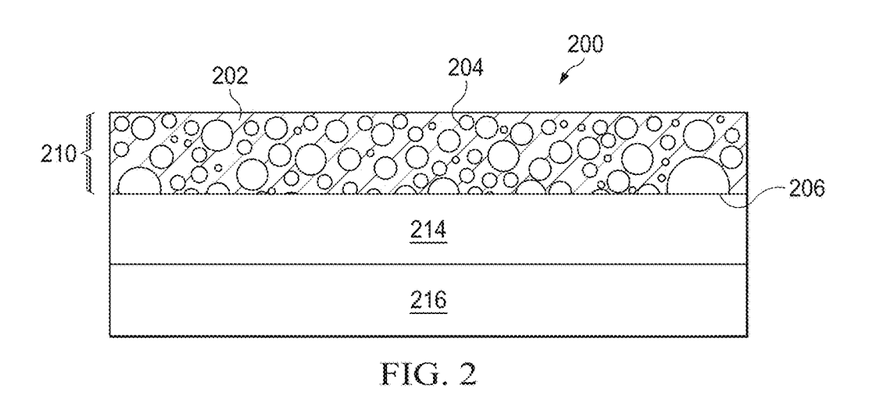
FIG. 2 is a block diagram of selected elements of an embodiment of a full cell.

Referring now to FIG. 2, selected elements of an example of a full cell 200 are shown. As shown, full cell 200 may be used for testing and evaluation of battery performance. Electrical connections, such as current collectors and posts for connections to an external circuit, are omitted from FIG. 2 for descriptive clarity. It is noted that FIG. 2 is a schematic illustration for descriptive purposes and is not drawn to scale and does not show an actual physical material structure.

As shown in FIG. 2, full cell 200 comprises an anode 210, a porous membrane 214 containing a liquid electrolyte, and a cathode 216. Anode 210 may be substantially similar to electrode 110 described above with respect to FIG. 1. Porous membrane 214 may operate in a similar manner, or may be substantially similar to porous separator 114 described above with respect to FIG. 1. Cathode 216 may be any suitable cathode material. In operation of full cell 200, as a result of the composition of anode 210, electrolyte-containing porous membrane 214, and cathode 216, an electrochemical potential may exist across anode 210 and cathode 216 and may result in a current flow when anode 210 and cathode 216 are connected through an electrical load. The electrochemical reaction may be reversible, such that when reverse current flow is applied, the battery is recharged and stores electrical energy. As shown, anode 210 comprises a matrix phase 202 and an absorbed phase 204, which may be substantially similar to matrix phase 102 and absorbed phase 104 in FIG. 1. When absorbed phase 204 is an immobilized liquid metal and matrix phase 202 is a porous matrix, absorbed phase 204 may contact a liquid electrolyte in porous separator 214 along surface 206.

In particular embodiments when anode 210 comprises a solid metal (not shown), such as an alkali metal or an alkali metal alloy, porous separator 214 may be a porous cellulose-based membrane. A solid metal used for anode 210 may contact the liquid electrolyte in porous separator 214 via nanopores or micropores in porous separator 214.

Figure 3:
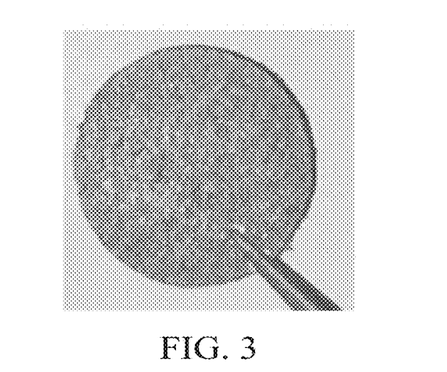
FIG. 3 is an image of an alkali metal alloy sheet electrode.

Referring now to FIG. 3, a photograph of a disk electrode formed from a KNC sheet is shown. The KNC sheet is a silvery membrane having the absorbed phase (the K—Na alloy used as a liquid-anode) immobilized therein and, thus, enabled to make electrical and ionic contact over the entire surface of the KNC sheet to the liquid-electrolyte. The disk electrode shown in FIG. 3 may be used as electrode 110 in FIG. 1 or anode 210 in FIG. 2. The disk electrode shown in FIG. 3 may be about ⅜ inch in diameter and of variable thickness.

EXAMPLES

First Example

The first example of a dendrite-free alkali-metal mode interfacing a liquid electrolyte is demonstrated with a first KNC sheet symmetric cell that is compared with a second Na sheet symmetric cell that develops dendrites.

The K—Na liquid alloy was made by mixing 33.7 wt. % Na and 66.3 wt. % K and shaking the container. A KNC sheet disk electrode was prepared by immersing a carbon-paper strip into the liquid K—Na alloy at 420° C. and cutting the cooled KNC sheet into ⅜ inch disks for coin-cells. The Na disk electrode was similarly prepared with solid Na metal sheet at 25° C. The KNC sheet disk electrodes and the Na sheet disk electrodes were each assembled into symmetric cells 100 (see FIG. 1) with a Celgard® separator containing a 1 M $NaClO_4$ in 1:1 ethylene carbonate (EC)/dimethyl carbonate (DEC) as electrolyte. Then, each respective symmetric cell was cycled at a current density of 0.4 mA $cm^{-2}$ for 2 h half cycles for each current polarity direction.

The symmetric cell 100 with the Na sheet disk electrodes and the Celgard® separator showed irregular voltage fluctuations indicative of continuous dendrite formation and breaking, where the cycle voltage amplitudes became larger with time until, after 465 hours, an explosion occurred as a result of an internal short-circuit.

Figure 4A:
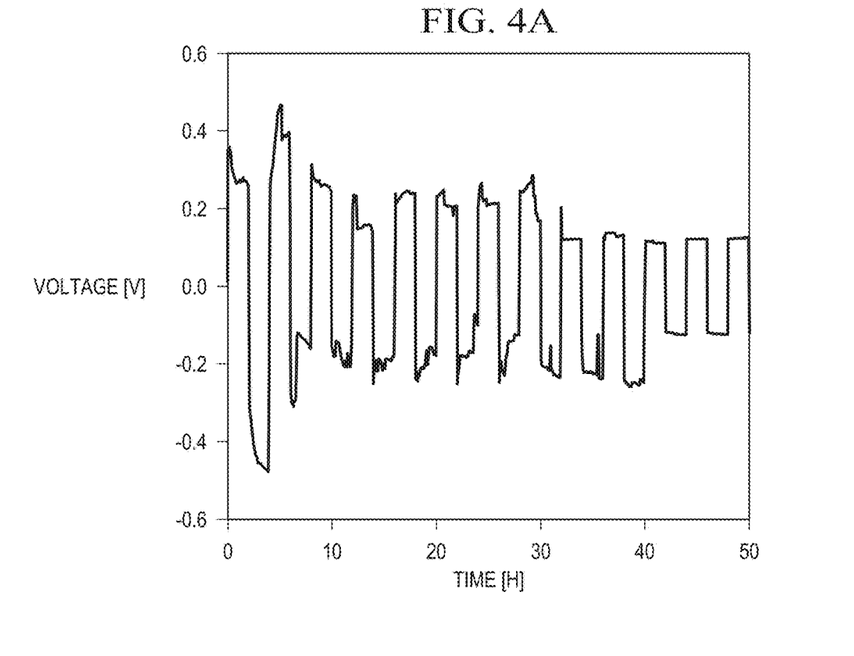
FIGS. 4A and 4B show voltage data for a cycle test of a symmetric cell with alkali metal alloy sheet electrodes.
Figure 4B:
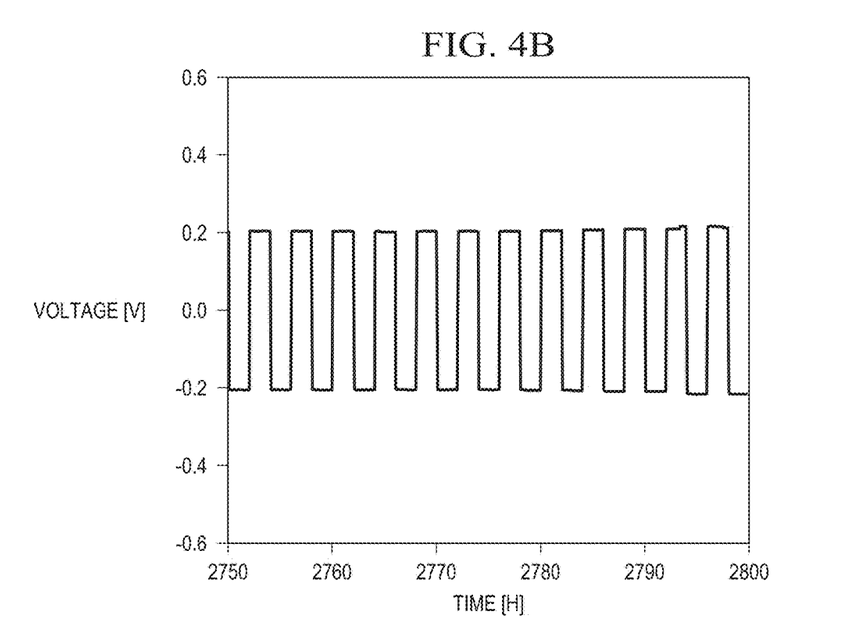

On the other hand, the symmetric cell 100 with the KNC sheet electrodes showed some relatively minor voltage fluctuations in the first 10 cycles, as shown in FIG. 4A, which were indicative of establishing liquid-liquid interfaces and, thus, indicated normal or expected behavior. After the initial period, very stable cycle voltage amplitudes were observed and the voltage changes showed very little or no fluctuations for the entire 2800 hour test duration. The final 50 hours of the 2800 hour test duration are shown in FIG. 4B, which were indicative of the voltage signal observed from after about the initial 50 hours. There was no sign of failure observed after the plating/stripping cycle operation for 2800 hours. The significant difference in the cycling behavior in the first example showed that KNC may serve as a dendrite-free anode for a safe alkali-metal anode with a long cycle life.

Second Example

In the second example, to test the behavior of the KNC sheet electrode as an anode 210 in a full cell 200 (see FIG. 2), a full cell 200 was assembled with the KNC sheet disk anode 210, glass fiber as the separator 214 containing 1 M $NaClO_4$ in propylene carbonate (PC) containing 10 wt. % fluroethylene carbonate (FEC) as electrolyte, and sodiated $Na_2MnFe(CN)_6$ as cathode 216. As a control, an identical full cell 200 was assembled with a Na sheet disk anode 210.

FIG. 5 shows the results of the second example with the KNC sheet anode full cell 200. In FIG. 5A, the initial evolution of the full cell voltage with cycle number at 1 C charge/discharge rate is shown. In FIGS. 5B and 5C, the changes in the voltage profile for different cycling rates are shown before and after the voltage increase at 87 cycles, respectively. In FIG. 5D, the capacity and the coulombic efficiency are shown over the initial 400 cycles. In FIG. 5E, energy dispersion X-ray spectra (EDS) of the $Na_2MnFe(CN)_6$ cathode 216 are shown after different cycles during the initial evolution of the full cell voltage.

Figure 5A:
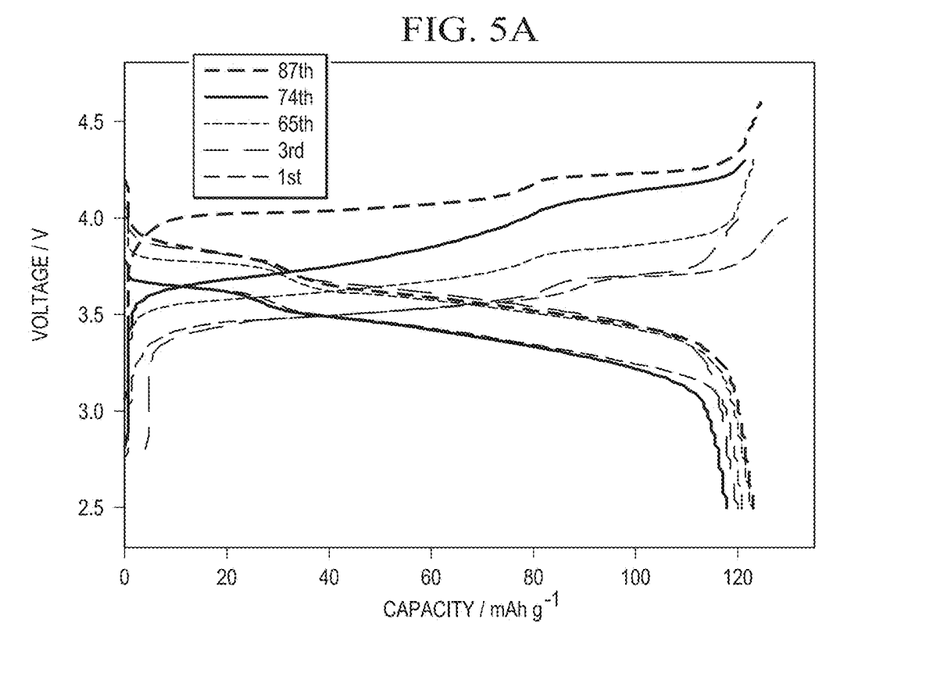
FIGS. 5A-5E show various data for a cycle test of a full cell with an alkali metal alloy sheet anode.

Specifically, FIG. 5A shows the evolution of the charge-discharge profile of the KNC sheet disk anode full cell 200 with $NaClO_4$ as salt at a charge/discharge rate of 1 C. In FIG. 5A the profile stabilizes after 87 cycles. The Na sheet disk anode full cell 200 exhibited a different behavior.

In FIG. 5A, the KNC sheet anode full cell 200 shows a step in the voltage profile after 87 cycles. When no water was present, the Na sheet disk anode full cell 200 does not show a step in the voltage profile. For the KNC sheet disk anode full cell 200, the discharge voltage increases 0.2 V after less than 65 cycles whereas the charge voltage increases 0.5 V before stabilizing after 87 cycles, which reduces somewhat the efficiency of electrical-energy storage.

Figure 5B:
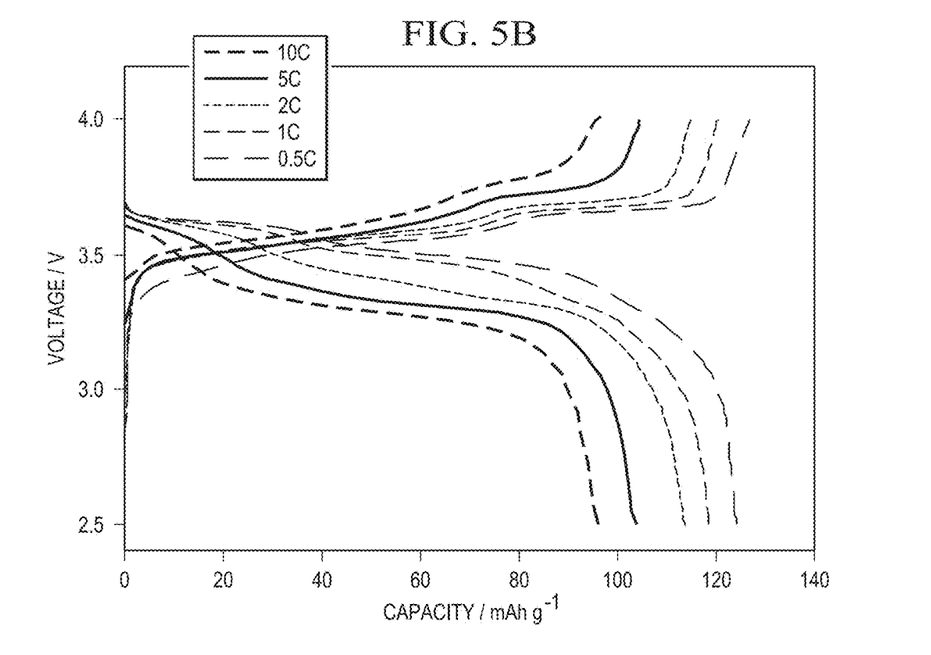
Figure 5C:
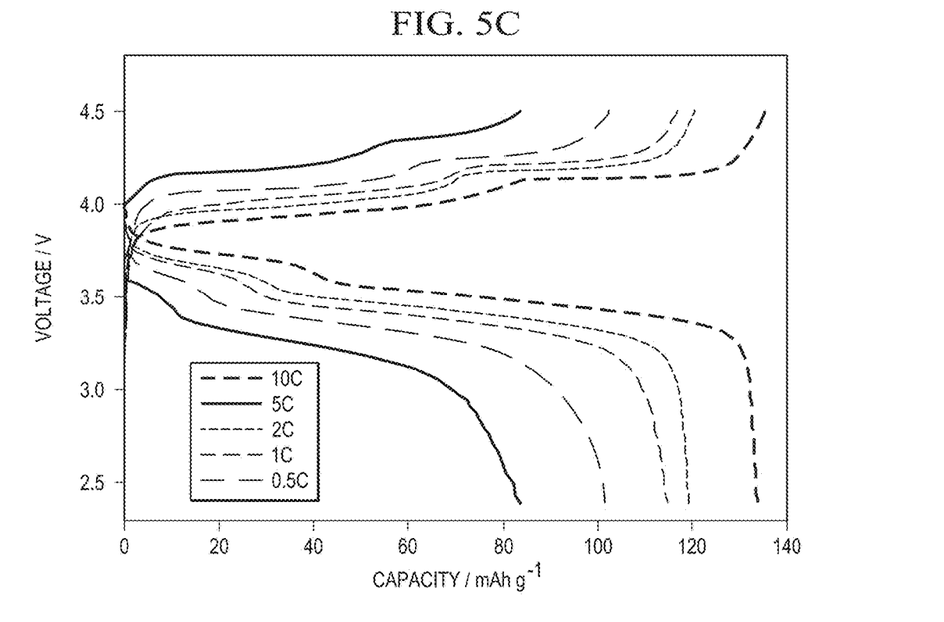
Figure 5D:
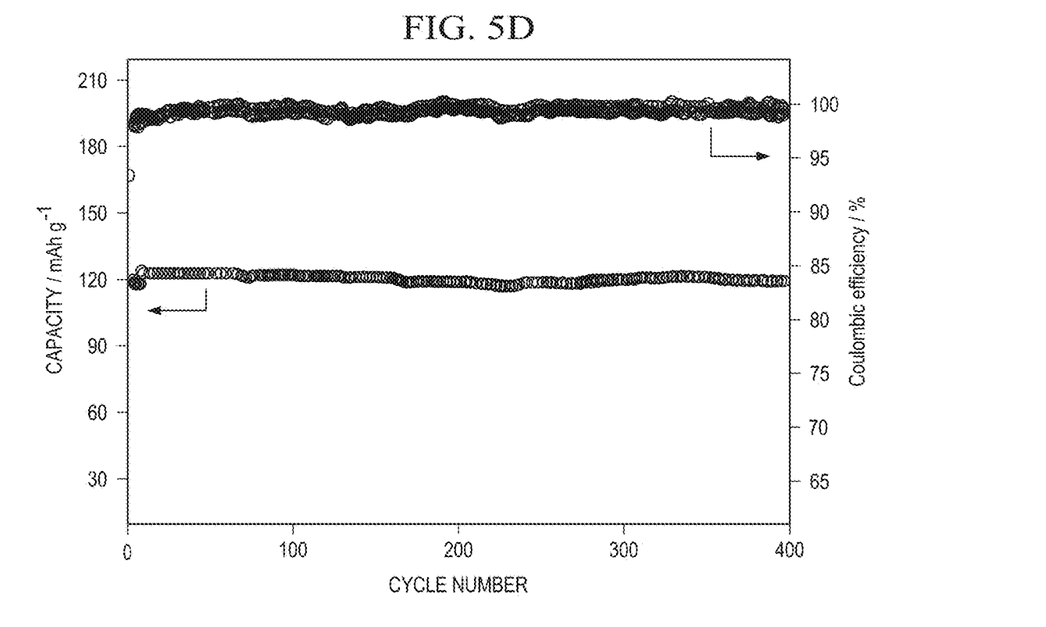

By comparing FIGS. 5B and 5C, the reduction of the capacity with rate of cycling of the full cell 200 after 87 cycles is evident, but 63% capacity is retained on increasing the rate to 10 C. In FIG. 5D, the KNC sheet anode full cell 200 shows excellent capacity retention at a constant rate as evidenced by the substantially flat slope. The corresponding curve (not shown) for the Na sheet anode full cell 200 shows a capacity decay.

Figure 5E:
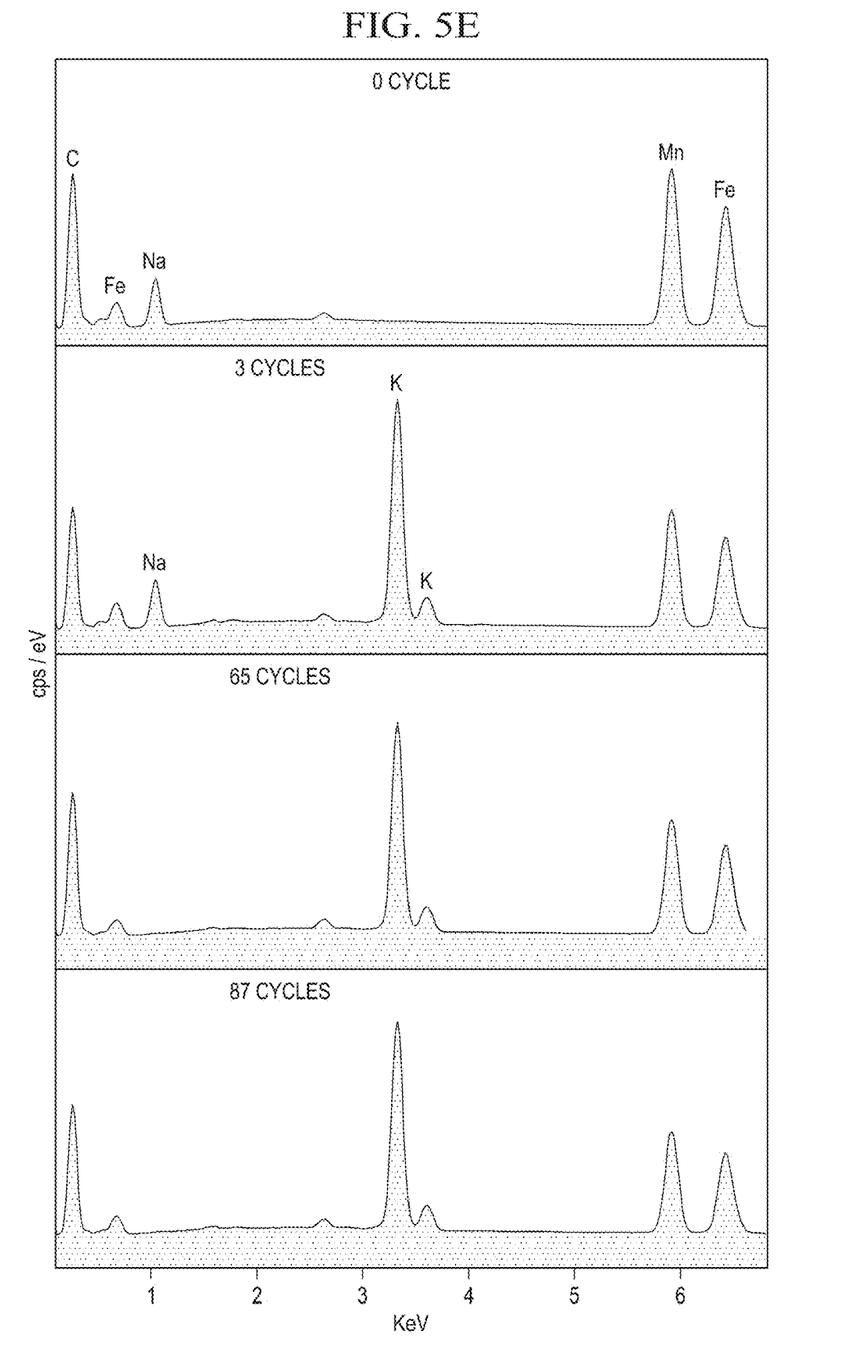

FIG. 5E shows energy dispersion X-ray spectra (EDS) of the $Na_2MnFe(CN)_6$ cathode 216 after different cycles during the initial evolution of the full cell voltage. After different cycling times, both full cells 200 were disassembled and the cathode composition was analyzed with EDS. The cathode spectrum before cycling (0 cycles) is included for reference. As the number of cycles increases in FIG. 5E, a replacement of $Na^+$ with $K^+$ becomes increasingly evident. After only 3 cycles, some $Na^+$ has been replaced by $K^+$, and the $Na^+$ peak has disappeared after 65 cycles. Once the $K^+$ becomes the dominant alkali ion in the cathode after 65 cycles, the cathode composition shows little change after 87 cycles. The data in FIG. 5E show that the increase in the discharge voltage is essentially a result of the more negative potential of K versus Na (−2.93 versus −2.71 V) with respect to a standard hydrogen electrode (SHE). The loss of storage efficiency with increasing $K^+$ content in the cathode indicates a larger resistance to $K^+$ transport across an electrode/electrolyte interface during charge than during discharge, and the reduction in the rate capability with $K^+$ insertion/extraction can be attributed, at least partially, to the lower solubility of the $K^+$ versus the $Na^+$ ion in the electrolyte.

The excellent cycling performance shows that the KNC sheet disk anode remains dendrite-free and stable. The change from $Na^+$ to $K^+$ as the working ion where the initial salt was $NaClO_4$ is a consequence of the higher Fermi energy of K versus Na, which favors $K^+$ transport to the electrolyte from the KNC sheet disk anode on discharge and $Na^+$ from the electrolyte to the KNC sheet disk anode on charge. The change from $Na^+$ to $K^+$ changes the initial $NaClO_4$ salt to $KClO_4$.

Third Example

Figure 6A:
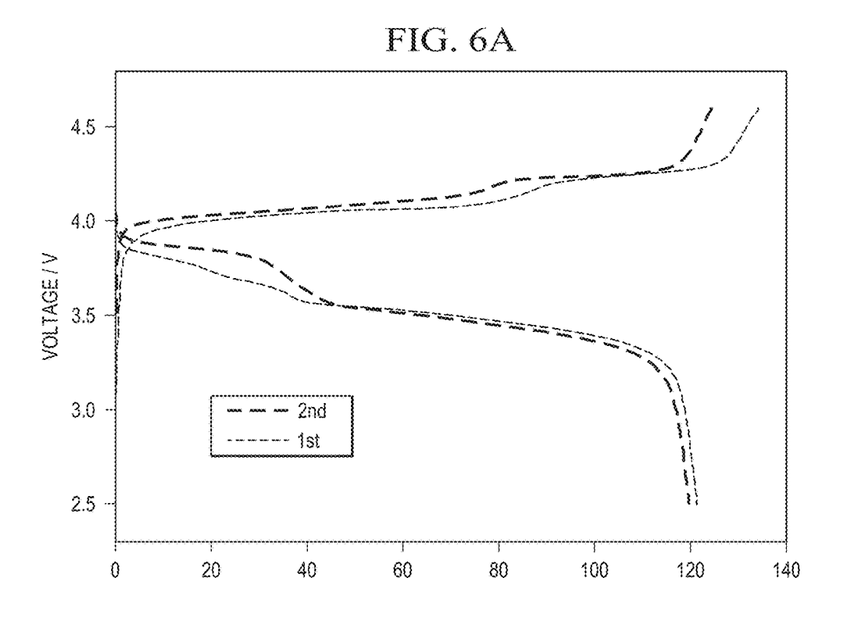
FIGS. 6A and 6B show various data for a cycle test of a full cell with an alkali metal alloy sheet anode.
Figure 6B:
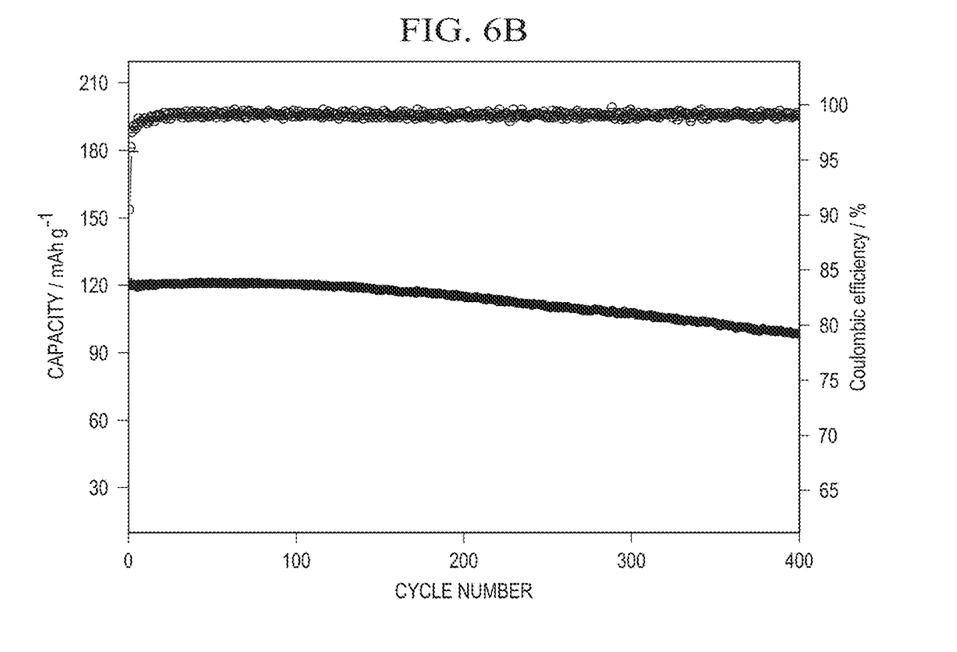

In the third example, to test the behavior of the KNC sheet electrode as an anode 210 in a full cell 200 (see FIG. 2), a full cell 200 was assembled with the KNC sheet disk anode 210, glass fiber as the separator 214 containing saturated $KClO_4$ in propylene carbonate (PC) containing 10 wt. % fluroethylene carbonate (FEC) as electrolyte, and sodiated $Na_2MnFe(CN)_6$ as cathode 216. In the third example, $KClO_4$ is used as the initial salt, the $K^+$ is the working ion from the start and the capacity retention is 81% after 400 cycles, as shown in FIG. 6. In comparison, a similar full cell 200 with a K metal anode 210 shows much faster capacity decay, which further confirms the advantage of the liquid anode.

Fourth Example

In the fourth example of a dendrite-free alkali-metal anode contacting an organic-liquid electrolyte, the alkali-metal anode was a sheet of solid metallic lithium with a nanoporous cellulose based membrane as separator at the interface between the solid anode and the organic-liquid electrolyte. Plating of solid metallic lithium occurred through the separator, and the plated lithium wet the surface of the separator. The pores of the separator were small enough that wetting of the separator prevented dendrite formation and prevented growth across the SEI layer passivating the anode-electrolyte reaction.

Figure 7A:
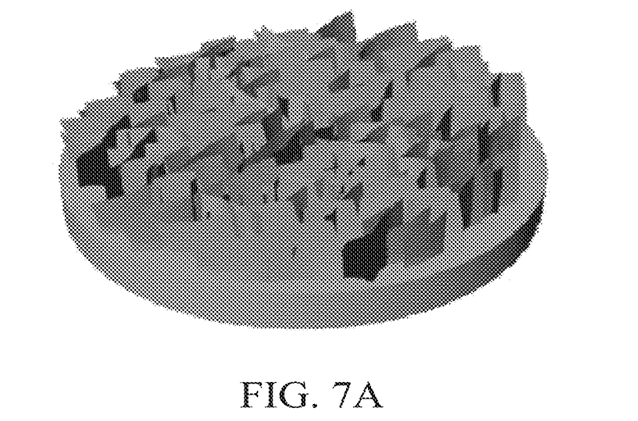
FIG. 7A is a depiction of a lithium anode used with a Celgard® porous separator.

FIG. 7A depicts an observed Li-metal anode used with a Celgard® porous separator. In FIG. 7A, dendrite formation and growth is evident.

Figure 7B:
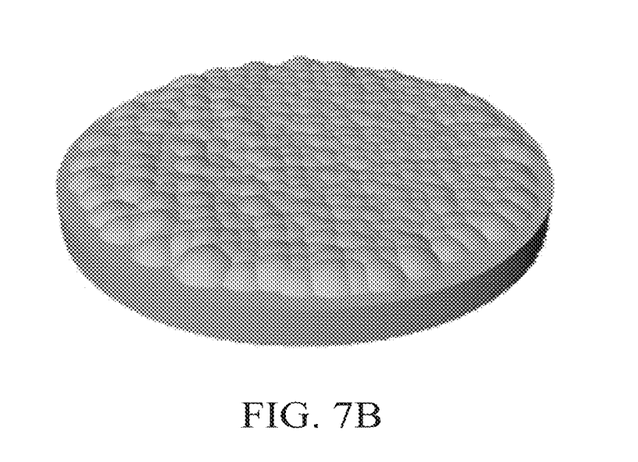
FIG. 7B is a depiction of a lithium anode used with a nanoporous cellulose-based porous separator.

FIG. 7B depicts a Li-metal anode used with a nanoporous cellulose-based separator. In FIG. 7B, dendrite formation is not observed.

As disclosed herein, a room-temperature liquid alkali metal alloy is immobilized in a mechanically strong, flexible porous membrane for use as a dendrite-free, safe anode in contact with an organic-liquid electrolyte in a full cell configuration. The use of $MnFe(CN)_6$ host cathode allows fast, reversible insertion of both the large guest ions, $Na^+$ and $K^+$, with acceptable capacities. The full cell configuration was demonstrated in a room-temperature test with a KNC sheet disk anode having a liquid K—Na alloy phase, a liquid-carbonate electrolyte containing either a $NaClO_4$ or a $KClO_4$ salt, a glass-fiber separator, and a sodiated $Na_2MnFe(CN)_6$ cathode. The liquid K—Na alloy phase is dendrite-free and immune to the structural degradations that occur with nanocrystalline electrode dendrites. Therefore, the liquid K—Na alloy phase cycles safely at high rates with excellent capacity retention.

The element of an alloy anode that reacts first with the electrolyte on discharge and last on charge is the one with the higher Fermi energy, and as a result, the cation of that element becomes the working ion of a full cell with an alloy anode. Since K has a higher Fermi energy than Na, the working ion of the tested full cell 200 with $NaClO_4$ as salt progressively became $K^+$ over the first 87 cycles. When a $KClO_4$ salt was used, the full cell was a rechargeable $K^+$-ion cell from the start. The behavior described in the examples disclosed herein is contemplated to apply to other liquid-alloy electrodes.

In the fourth example, an alternative example of plating a dendrite-free alkali-metal anode uses a liquid electrolyte with a solid alkali-metal as the anode and therefore a different strategy for the interface between the anode and an organic-liquid electrolyte. A nanoporous cellulose-based separator was used that was commercially available. The cellulose-based separator is representative of a membrane that is wet by a solid alkali-metal. The distribution of nanopores allows contact between the solid anode and liquid electrolyte for transfer between the anode and electrolyte of the working cation $Li^+$ in the fourth example. The nanopores (or micropores) are small enough that dendrites are not observed forming on the solid Li anode at the interface with the liquid electrolyte.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

The invention claimed is:

1. A battery cell, including a rechargeable electrochemical cell, the rechargeable electrochemical cell comprising:
   an anode comprising a current collector and a liquid sodium(Na)-potassium(K) alloy-metal comprising between 9.2 to 58.2 wt. % Na at 25° C. immobilized in a porous membrane;
   a separator membrane;
   a liquid electrolyte in the separator membrane that contacts the liquid anode via the separator membrane: and
   a solid cathode,
   wherein the separator membrane transports K ions between the separator membrane and the liquid anode.

2. The battery cell of claim 1, wherein the porous membrane is selected from at least one of:
   a carbon-based membrane;
   a polymer membrane;
   a porous ceramic membrane;
   a porous gel membrane;
   a cellulose-based membrane; and
   a fiber-matrix membrane.

3. The battery cell of claim 2, wherein the fiber-matrix membrane is coated with at least one of:
   a carbon-based material;
   a glass material;
   a polymer;
   a cellulose-based material.

4. The battery cell of claim 1, wherein the cathode comprises Na.

5. The battery cell of claim 1, wherein the battery has been cycled and the cathode comprises K.

6. The battery cell of claim 1, wherein the battery has been cycled and the cathode comprises Na and K.

7. The battery cell of claim 1, wherein the cathode comprises $Na_2MnFe(CN)_6$.

8. The battery cell of claim 1, wherein the battery cell has been cycled and the cathode comprise $K_2MnFe(CN)_6$.

9. The battery cell of claim 1, wherein the electrolyte comprises K ions.

10. The battery cell of claim 9, wherein electrolyte comprises $KClO_4$.

11. The battery cell of claim 1, wherein the separator membrane additionally transports Na ions between the separator membrane and the liquid anode and the electrolyte comprises Na ions.

12. The battery cell of claim 11, wherein the electrolyte further comprises $NaClO_4$.

13. A battery cell, including a rechargeable electrochemical cell, the rechargeable electrochemical cell comprising:
   an anode comprising a current collector and a liquid sodium(Na)-potassium(K) alloy-metal comprising between 9.2 to 58.2 wt. % Na at 25° C. immobilized in a porous membrane;
   a separator membrane;
   a liquid electrolyte in the separator membrane that contacts the liquid anode via the separator membrane; and
   a solid cathode,
   wherein the separator membrane transports Na ions between the separator membrane and the liquid anode.

14. The battery cell of claim 13, wherein the porous membrane is selected from at least one of:
   a carbon-based membrane;
   a polymer membrane;
   a porous ceramic membrane;
   a porous gel membrane;
   a cellulose-based membrane; and
   a fiber-matrix membrane.

15. The battery cell of claim 14, wherein the fiber-matrix membrane is coated with at least one of:
   a carbon-based material;
   a glass material;
   a polymer;
   a cellulose-based material.

16. The battery cell of claim 13, wherein the cathode comprises Na.

17. The battery cell of claim 13, wherein the cathode comprises $Na_2MnFe(CN)_6$.

18. The battery cell of claim 13, wherein the electrolyte comprises Na ions.

19. The battery cell of claim 18, wherein electrolyte comprises $KClO_4$.

* * * * *